(12) United States Patent
West (10) Patent No.: US 12,091,181 B2
(45) Date of Patent: Sep. 17, 2024

(54) AIRCRAFT ENGINE ATTACHMENT ASSEMBLY

(71) Applicant: SPIRIT AEROSYSTEMS, INC., Wichita, KS (US)

(72) Inventor: Randall Ray West, Wichita, KS (US)

(73) Assignee: Spirit AeroSystems, Inc., Witchita, KS (US)

( * ) Notice: Subject to any disclaimer, the term of this patent is extended or adjusted under 35 U.S.C. 154(b) by 344 days.

(21) Appl. No.: 17/548,868

(22) Filed: Dec. 13, 2021

(65) Prior Publication Data

US 2023/0182910 A1 Jun. 15, 2023

(51) Int. Cl.
| | |
|---|---|
| *B64D 27/40* | (2024.01) |
| *B64C 3/18* | (2006.01) |
| *B64C 7/00* | (2006.01) |
| *B64D 27/12* | (2006.01) |
| *B64D 29/02* | (2006.01) |
| *F02K 1/70* | (2006.01) |

(52) U.S. Cl.
CPC ............... *B64D 27/40* (2024.01); *B64C 3/18* (2013.01); *B64C 3/185* (2013.01); *B64C 7/00* (2013.01); *B64D 27/12* (2013.01); *B64D 29/02* (2013.01); *F02K 1/70* (2013.01); *B64D 27/406* (2024.01); *F05D 2220/36* (2013.01)

(58) Field of Classification Search
CPC ........ B64D 27/40; B64D 27/12; B64D 29/02; B64C 3/185; B64C 7/00; F02K 1/70; F05D 2220/36
See application file for complete search history.

(56) References Cited

U.S. PATENT DOCUMENTS

| | | | |
|---|---|---|---|
| 3,848,832 A | 11/1974 | Stanley et al. | |
| 3,920,203 A * | 11/1975 | Moorehead | F02K 1/70 |
| | | | 244/81 |
| 4,266,741 A | 5/1981 | Murphy | |
| 4,643,376 A | 2/1987 | Vanderhoeven | |
| 4,940,196 A | 7/1990 | Lardellier | |
| 5,653,406 A | 8/1997 | Amano et al. | |

(Continued)

OTHER PUBLICATIONS

European Search Report in related EP Application 22213004.9 mailed Jun. 15, 2023, 13 pages.

(Continued)

*Primary Examiner* — Richard Green
*Assistant Examiner* — Steven J Shur
(74) *Attorney, Agent, or Firm* — Stinson LLP (57) ABSTRACT

An aircraft propulsion system configured to be supported from an aircraft wing having a leading edge and opposing upper and lower surfaces. The aircraft propulsion system broadly comprises an engine having a core, a fan case, and a nacelle including a plurality of access panels, and an attachment assembly for securing the engine to the aircraft wing. The attachment assembly broadly comprises an upper support section including a number of spars and a number of ribs connected between the spars, a lower support section, and an aft section. The attachment assembly aerodynamically melds the nacelle and the aircraft wing together via the upper support section so that air flowing over the engine flows over the aircraft wing along the upper surface and air flowing laterally alongside the nacelle flows under the aircraft wing along the lower surface.

20 Claims, 8 Drawing Sheets

(56) References Cited

U.S. PATENT DOCUMENTS

| | | | |
|---|---|---|---|
| 7,669,785 B2 | 3/2010 | Shmilovich et al. | |
| 7,784,733 B2 | 8/2010 | Diochon et al. | |
| 8,006,931 B2 | 8/2011 | Dantin et al. | |
| 9,062,626 B2 | 6/2015 | Marche | |
| 9,211,955 B1 | 12/2015 | Mauldin et al. | |
| 9,868,543 B2 | 1/2018 | Pautis et al. | |
| 9,889,942 B2 | 2/2018 | Pautis et al. | |
| 10,358,226 B2 | 7/2019 | Pautis | |
| 2007/0205324 A1* | 9/2007 | Diochon | B64D 27/40 244/54 |
| 2009/0032639 A1* | 2/2009 | Dantin | B64D 29/02 244/37 |
| 2016/0052637 A1* | 2/2016 | Mauldin | B64D 29/00 244/54 |
| 2016/0229545 A1* | 8/2016 | Pautis | B64D 27/12 |

OTHER PUBLICATIONS

Partial European Search Report in related EP Application 22213004.9 mailed Apr. 17, 2023, 11 pages.

\* cited by examiner

AIRCRAFT ENGINE ATTACHMENT ASSEMBLY

BACKGROUND

Large aircraft engines such as ultra-high by-pass turbofans are difficult to integrate with aircraft wings. For example, to avoid detrimental effects of increasing landing gear height, large engines are typically positioned vertically closer to the wings. Unfortunately, vertical proximity to the wings requires the engines to be spaced forward from the wings to lessen aerodynamic interference therebetween. Nacelle components of the engines may also require the engines to be placed even farther forward to allow engine maintenance access. Pylons capable of supporting the engines in these positions are heavy and difficult to manufacture and assemble, and they reduce fan duct airflow.

SUMMARY

Embodiments of the invention solve the above-mentioned problems and other problems and provide a distinct advancement in the art of aircraft engine pylons and engine attachment assemblies. More particularly, the invention provides an aircraft propulsion system including an attachment assembly that blends with an aerodynamic shape of the wing and includes an upper support section that supports at least some of the engine's weight.

An embodiment of the invention is an aircraft propulsion system broadly comprising an aircraft engine and an aircraft engine attachment assembly. The engine includes a core, a fan, a fan case, a nacelle, and a number of mounts for connecting the engine to the attachment assembly.

The core is centrally located in the engine and includes a compressor, a burner, a turbine, and other components for creating combustion. The core turns the fan and expels hot exhaust gas from the rear of the engine.

The fan is positioned near a front of the engine and is rotationally connected to components of the core. The fan generates forward thrust by propelling airflow rearward through fan ducts that bypass the core. The fan also directs airflow to the compressor.

The fan case encircles the fan to ensure air flows through the fan. The fan case also provides protection to the fan.

The nacelle encloses internal components of the engine and includes an inlet, a number of fan cowls, a number of thrust reversers, and a number of core cowls. The nacelle may aerodynamically blend with the upper support section of the attachment assembly (described in more detail below). The nacelle also forms a fan duct bypassing the core.

The inlet is the forward-most portion of the nacelle and aerodynamically guides airflow toward the fan. The inlet also aerodynamically guides airflow around the engine (alongside and below the nacelle and over the upper support section of the attachment assembly.

The fan cowls provide access to the fan and may be pivotably attached to the lower support section of the attachment assembly. The fan cowls may be mounted lower than conventional fan cowls, thus allowing them to provide improved access to the fan. More specifically, this allows greater cowling open angles and reduces size and weight of the fan cowls. The lower pivot axis facilitates engine placement closer to the wing.

The thrust reversers may be vents or air passageways including actuatable doors or assemblies configured to be opened and redirect fan duct airflow forward, thus providing reverse thrust. The thrust reversers are described as being part of the nacelle, but they may also or alternatively be incorporated or integrated into the attachment assembly. Thrust reversers of the attachment assembly and nacelle may be activated independently or in coordination.

Alternatively, nacelle components of different configurations may be used. For example, a one-piece thrust reverser or fan duct spanning from side to side and slideably supported by the attachment assembly to translate rearward and thereby provide access to internal components may be implemented.

The thrust reversers may be activated via mechanical or electronic means, which may employ coordination of the thrust reversers (including thrust reversers integrated into the attachment assembly). This may include pivoting or linkage connections, interlocking features, flexible drive shafts, hoses, or cables. The thrust reversers may include flow-directing cascades. Non-translating cowl type thrust reversers may be most beneficial in terms of their low weight.

The core cowls are fan duct flow surfaces closest to and covering the core. The core cowls may be supported from and pivotably or slideably attached to the lower support section of the attachment assembly. Alternatively, the core cowls may be pivotably or slideably attached to supports on the core.

Nacelle components conventionally are configured with their pivot point as high as possible to facilitate greater engine access. However, engine placement close to the wing may limit the ability to open these components (especially on the inboard side). Thus, the nacelle components of the present invention may have a lower pivoting interface to reduce their swing path and prevent interference with the wing.

Integration of movable reverse thrust components may result in a "dead zone" near reverse thrust support structure. It may be beneficial to lower the upper edge of some reverse thrust components to approximately a horizontal plane passing through the engine centerline. For example, lowering the upper edge of such reverse thrust components may allow the use of a one-piece thrust reverser with a substantially fore-aft sliding support. Additional "fixed" reverse thrust components may be integrated above this upper edge.

The fan ducts are airflow channels that bypass the core. The fan ducts are outwardly bounded by the inlet, fan case, and fan cowls and inwardly bounded by the core cowls. Fan duct airflow may also be redirected by the thrust reversers.

The mounts include forward mounts, core mounts, and an aft mount. The forward mounts provide a connection point for an upper support section of the attachment assembly. The core mounts and the aft mount provide a connection point for a lower support section of the attachment assembly. These components are described in more detail below.

The attachment assembly comprises an upper support section, a lower support section, and an aft section. The attachment assembly (and the upper support section in particular), aerodynamically blends the shape of the engine with the shape of the wing to lessen flow separation to minimize drag and performance penalties.

The upper support section includes a number of spars, a number of ribs, a number of forward engine supports, an upper skin, a lower skin, a fan duct acoustic panel, and opposing left and right strakes. The upper support section (and the spars, ribs, upper skin, and lower skin in particular) may be at least partially formed of composite material. This allows the upper support section to have optimized shaping, an improved strength-to-weight ratio, and better resilience under high temperatures. The upper support section may have a width greater than its height. In one embodiment, the upper support section may have a width between approximately 50 percent and approximately 70 percent of a width of the engine.

The spars extend longitudinally from the wing to the inlet of the engine (described below). In one embodiment, the spars include a middle spar and opposing left and right spars laterally spaced from and lower than the middle spar. Other numbers of spars including between two spars and ten spars, for example, may be used. At least portions of the spars may be slightly shaped (e.g., tapered or curved) to accommodate other components or for aerodynamics (particularly for open airflow above the attachment assembly and fan airflow within the engine and attachment assembly as described in more detail below.

The ribs extend laterally between the spars to form a rigid, structural grid. At least portions of the ribs may be slightly shaped (e.g., tapered or curved) to accommodate other components or for aerodynamics (particularly for open airflow above the attachment assembly and fan airflow within the engine and attachment assembly as described in more detail below. For example, the ribs may be substantially arcuate so that the upper support section is laterally bowed, thereby conforming to an overall shape of the engine.

The orthogonal orientation of the spars and ribs as described is just one arrangement that achieves objectives of the invention. Other or additional architecture such as those derived from biomimicry syntheses and alternative materials may also be used. The enlarged structural volume and self-stiffening curved shape of the upper support section provides improved torsional stiffness for managing deflection of the engine.

The forward engine supports may be positioned on the left, right, and center spars and attach the upper support section to the fan case via the forward mounts. The forward engine supports may include failsafe or backup features such as tang-and-catcher elements and pin and receiving bore interfaces. The forward engine supports may only need to react lateral (side-to-side) loads, vertical loads, and torque about the engine centerline. In combination with other supports, the forward engine supports may also react pitching and yaw moments.

The forward engine supports may be positioned substantially in a single plane. Additional support may be employed in a forward region of the upper support section to further stabilize the fan case, thus reducing the potential for "backbone" bending (i.e., flexing of the engine along its centerline axis).

A central support (e.g., the forward engine support positioned on the center spar) may include a resilient restraint for resisting lateral and fore-aft movement of the engine. The central support may also be used as a hoist point for raising and lowering the engine (e.g., for engine changes).

The upper skin extends over the spars and ribs to form a continuous aerodynamic surface from the inlet of the engine to the upper surface of the wing. As mentioned above, the upper skin may be formed of composite material or any other suitable material. The upper skin may also be coated in an aerodynamic material.

The lower skin extends under the spars and ribs. The lower skin may at least partially serve as an aerodynamic surface for fan duct airflow and as such may be treated for aerodynamics and acoustics. As mentioned above, the lower skin may be formed of composite material or any other suitable material. The lower skin may be integral to the spars and ribs or may be configured to be separable therefrom.

The fan duct acoustic panel may be attached to the lower skin and reduces acoustic output of the engine. The fan duct acoustic panel may also be shaped to help direct fan duct airflow.

The left and right strakes may connect the left and right spars and the leading edge of the wing. Upper surfaces of the left and right strakes smoothly blend with the upper surface of the upper support section and the upper surface of the wing. Lower surfaces of the left and right strakes blend the nacelle with the lower surface of the wing. In this way, the left and right strakes aerodynamically meld the attachment assembly and the leading edge together to smoothly divide air flowing over the engine and air flowing laterally alongside the nacelle. Forward portions of the left and right strakes may extend over a majority of the nacelle. In many embodiments, the left and right strakes are not identical, but may mirror left and right strakes for an opposing engine. A shape of the left and right strakes may conform to local flow lines.

The upper support section may also include thrust reverse components or capability (also described below). The thrust reverse components may allow fan duct flow to pass between the spars and ribs. Shape and width of the upper support section may be influenced by the left and right strakes and reverse thrust integration. The left and right strakes may be "secondary structure" and not an integral part of the upper support section, which may simplify manufacturing and maintainability. As such, strake location may be seen as constraining an overall width of the upper support section. On the other hand, reverse thrust flow passages may need to maximize flow, thus requiring the reverse thrust flow passages and hence the upper support section to be as wide as possible.

The lower support section includes an aft engine support member, a support beam, left and right thrust links, an aft engine support, a bifurcation fairing, and a fire seal. The lower support section provides direct support to the core.

The aft engine support member extends forward from the wing under the upper support section. The aft engine support member may have sufficient strength and rigidity to bear much of the weight of the core.

The support beam extends forward and diagonally downward from the aft engine support member to near the thrust links forward connection on the upper side of the core. The lower support section reacts a large portion of the weight of the core and thrust loads to the aft engine support member.

The left and right thrust links extend forward and diagonally downward and laterally outward from the aft engine support member to core mounts on the left and right sides of the core. The left and right thrust links transmit thrust forces of the engine to the aft engine support member.

The aft engine support connects to core mounts near a rear portion of the top side of the core. The aft engine support reacts weight and thrust load forces of the back end of the core to the aft engine support member.

The bifurcation fairing may be positioned near a front of the aft engine support member. The bifurcation fairing redirects fan duct airflow around the aft engine support member and other internal components. The bifurcation fairing may be constructed of heat-resilient materials high-temperature composites.

The fire seal may be positioned below the aft engine support member and the support beam. The fire seal may be made of a heat and fire-resistant material to protect many of the structural components (e.g., aft engine support member, support beam, and upper support section) from engine fire. To that end, the fire seal may be a sheet material or a sealant coating these components.

The aft section includes a number of fairings, a fairing heat shield, a wing heat shield, and thermal insulation. The aft section provides improved aerodynamics, thermal protection, and improved acoustic characteristics in the vicinity of the engine.

The fairings include inboard and outboard fairings configured to aerodynamically bring fan duct airflow together behind the lower support section below the lower surface of the wing. More specifically, the fairings optimize airflow along the lower surface of the wing at locations inboard and outboard of the engine centerline. The fairings may integrate to portions of the nacelle fan duct that may extend aft of the nacelle fan duct exit plane and may have a shape approximate to a fan air exhaust plume expansion boundary. The fairings may also control or optimize airflow along the lower surface of the wing. More specifically, the fairings may channel fan duct airflow below the lower surface of the wing to lessen parasitic scrubbing drag that may occur from fan duct airflow friction with the lower surface of the wing.

The fairing heat shield may be positioned below the fairings to mitigate engine exhaust impingement and radiant thermal exposure to the lower surface of the wing. The fairing heat shield may be formed of high heat resistant material such as high-temperature composites or sealants.

The wing heat shield may be positioned adjacent the lower surface of the wing to provide further protection to the wing from engine exhaust impingement and radiant thermal exposure. The wing heat shield may employ an air gap between itself and the lower surface of the wing. The wing heat shield may be formed of high heat resistant material such as high-temperature composites.

Another embodiment of the invention is an aircraft propulsion system similar to the aircraft propulsion system described above, with the upper support section of the attachment assembly further including a number of airflow vents.

The airflow vents extend from the fan duct to the upper skin. The airflow vents utilize fan duct airflow to re-energize the boundary layer of air flowing over the upper support section and the upper surface of the wing, thus aiding in continued flow attachment.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. Directional terms such as "longitudinal" and "lateral" are generally in reference to a standard aircraft orientation. For example, longitudinal features may be generally aligned with the aircraft's primary direction of travel while lateral features may extend horizontally perpendicular to the aircraft's primary direction of travel.

Figure 1:
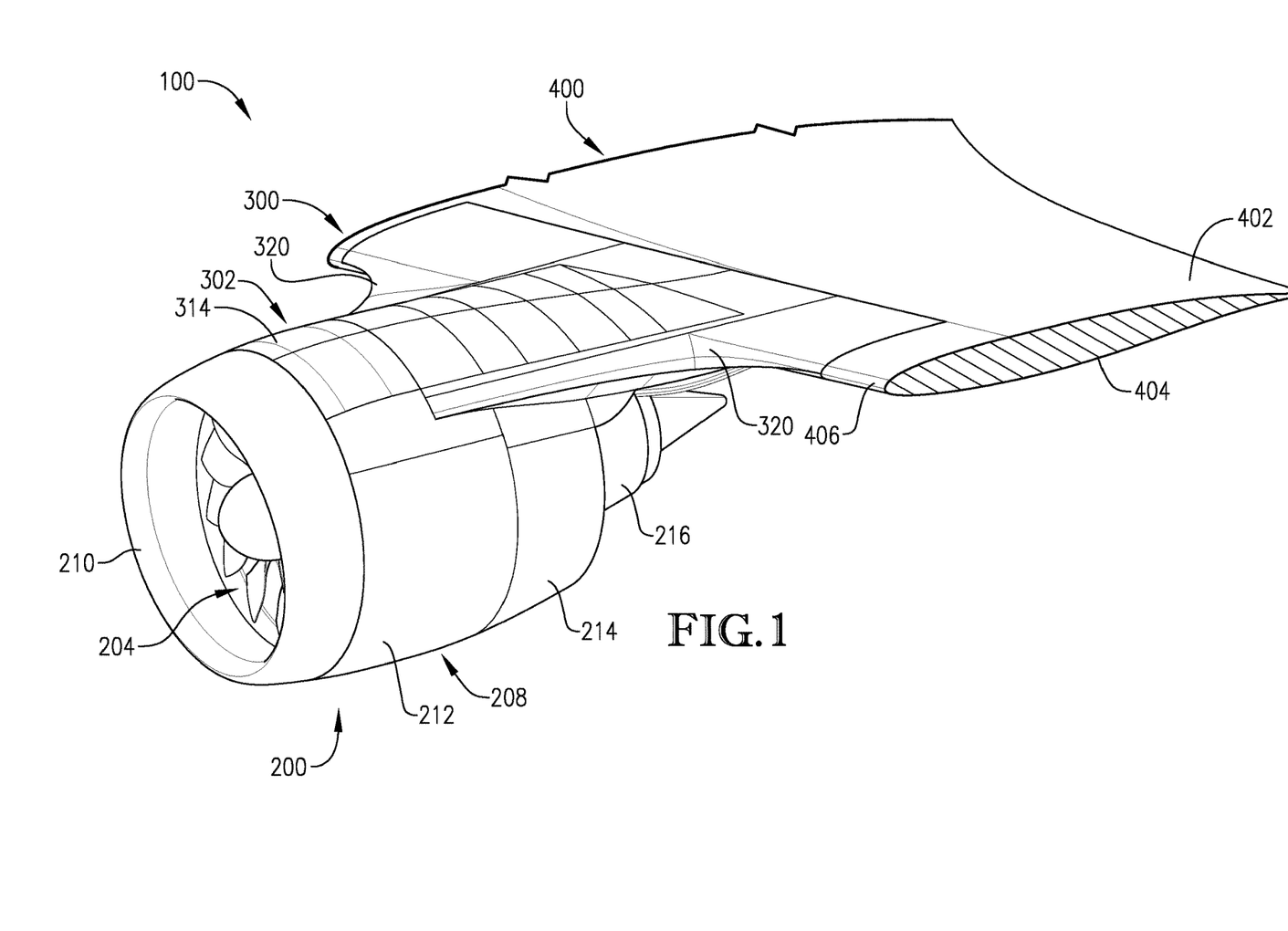
FIG. 1 is a perspective partial cutaway view of an aircraft propulsion system constructed in accordance with an embodiment of the invention.
Figure 2:
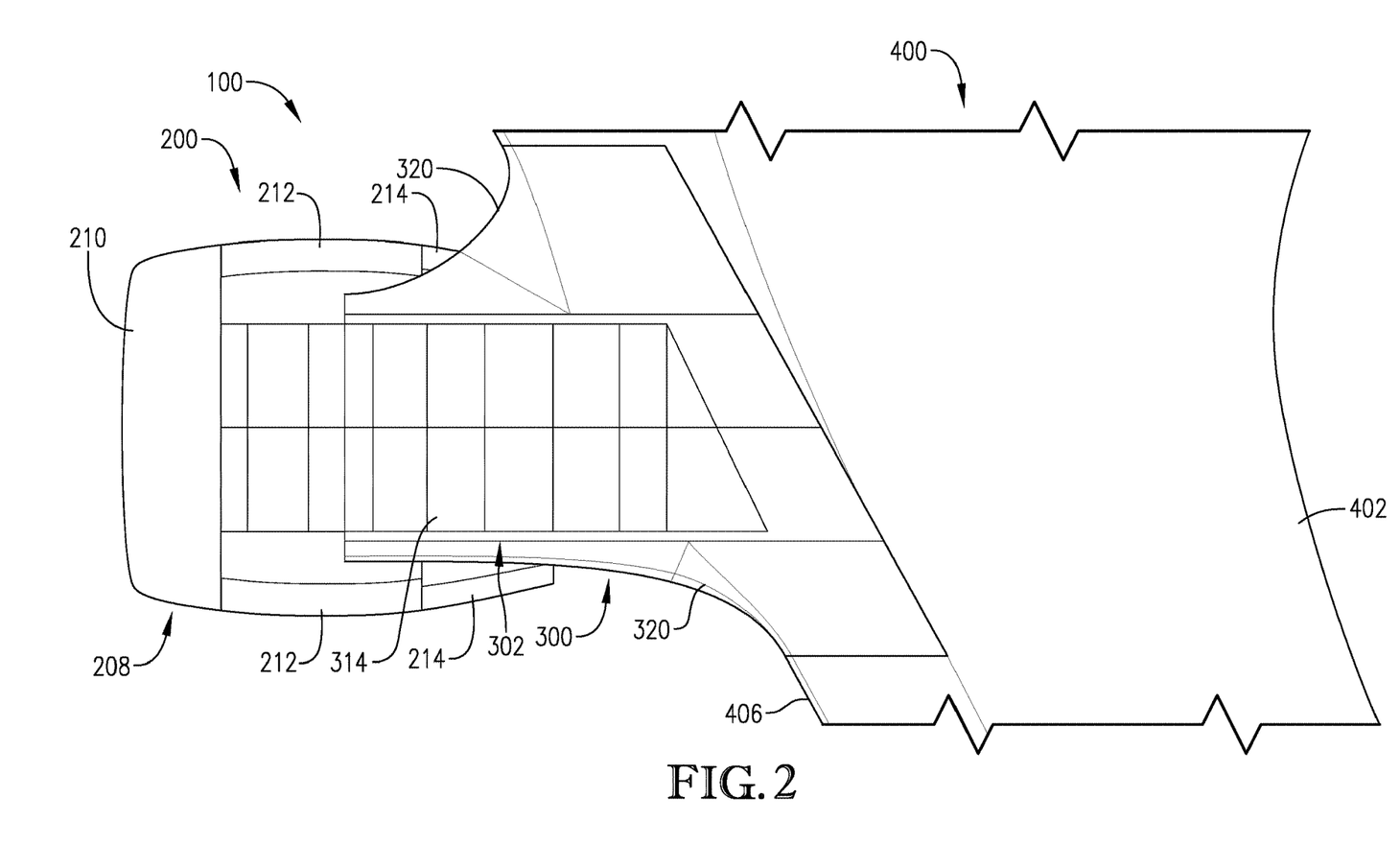
FIG. 2 is a top plan view of the aircraft propulsion system of FIG. 1.
Figure 3:
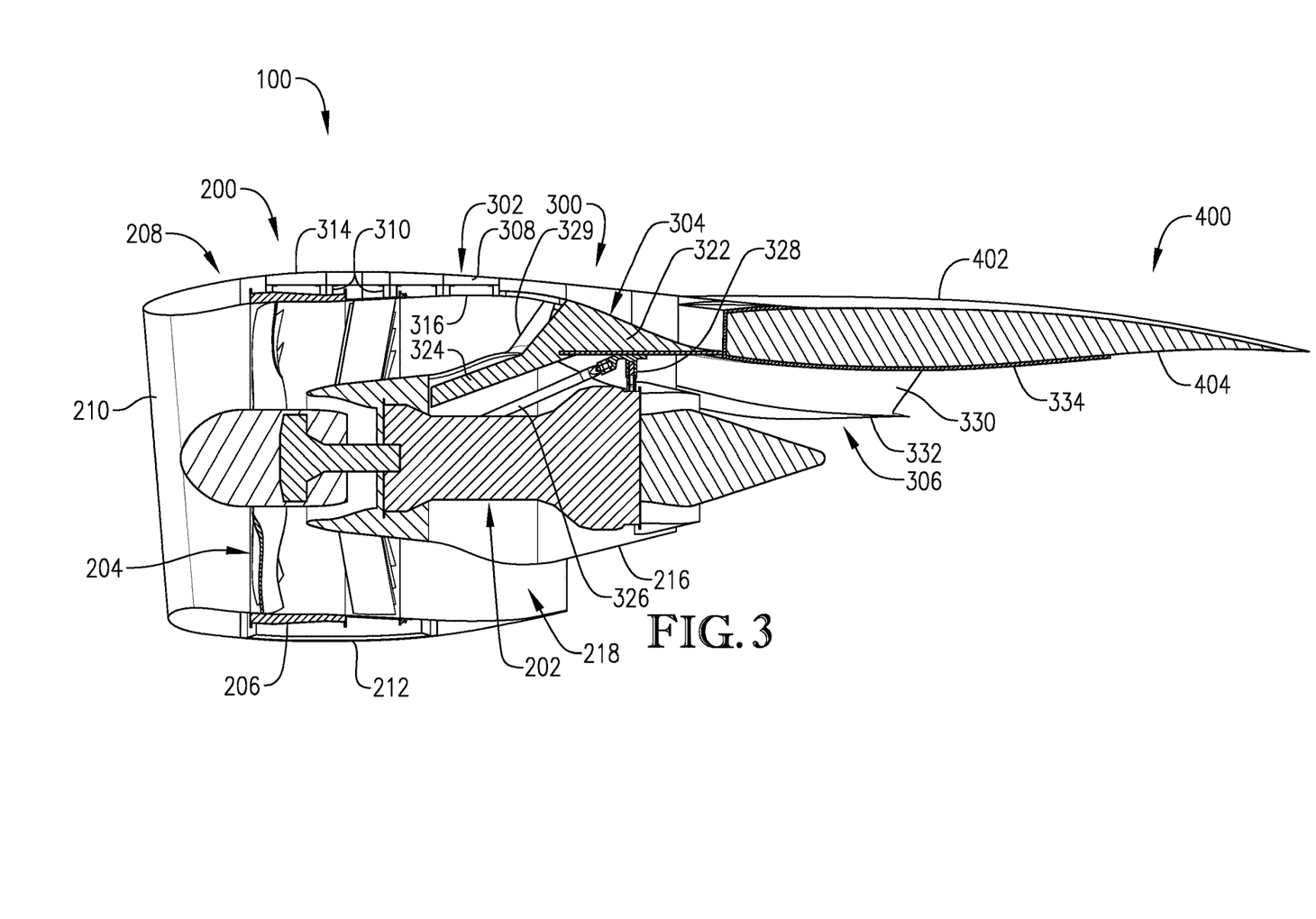
FIG. 3 is a side cutaway elevation view of the aircraft propulsion system of FIG. 1.
Figure 4:
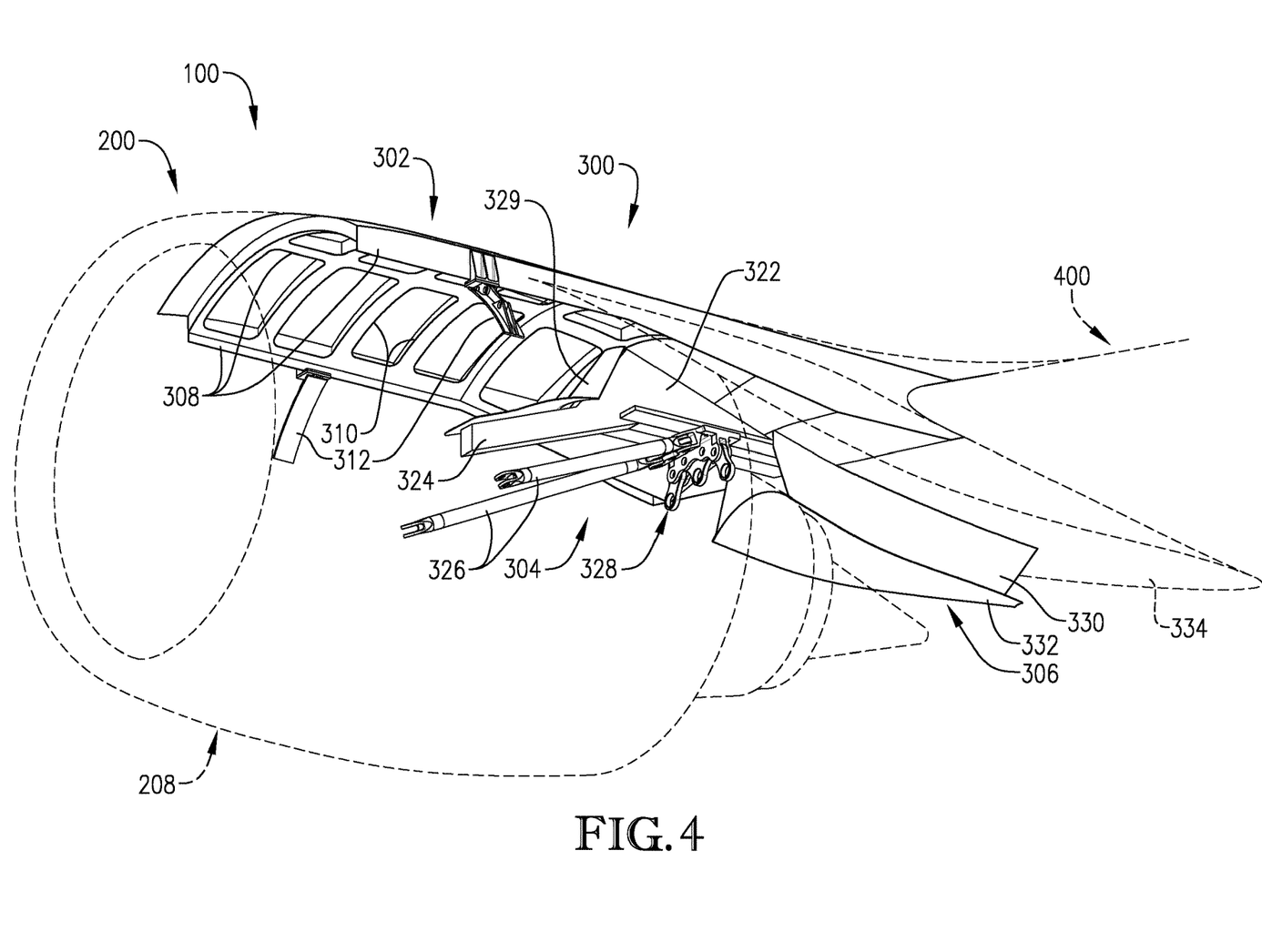
FIG. 4 is a bottom perspective view of certain components of the aircraft propulsion system of FIG. 1.

Turning to FIGS. 1-4, an aircraft propulsion system 100 constructed in accordance with an embodiment of the invention is illustrated. The aircraft propulsion system 100 broadly comprises an engine 200 and an attachment assembly 300.

The engine 200 includes a core 202, a fan 204, a fan case 206, a nacelle 208, and a plurality of mounts for connecting the engine to the attachment assembly. The engine 200 is described herein as an ultra-high by-pass turbofan, but other propulsion assemblies such as turboprop engines, electric motors, and hybrid-electric engines (inline turbine and electric motor) may be used. The ultra-high by-pass turbofan engine 200 is a separate flow engine-nacelle configuration, but mixed flow engine-nacelle configurations may also be used.

The core 202 is centrally located in the engine 200 and includes a compressor, a burner, a turbine, and other components for creating combustion. The core 202 turns the fan and expels hot exhaust gas from the rear of the engine 200.

The fan 204 is positioned near a front of the engine 200 and is rotationally connected to components of the core 202. The fan 204 generates forward thrust by propelling airflow rearward through fan ducts that bypass the core 202. The fan 204 also directs airflow to the compressor.

The fan case 206 encircles the fan 204 to ensure air flows through the fan 204. The fan case 206 also provides protection to the fan 204.

The nacelle 208 encloses internal components of the engine 200 and includes an inlet 210, a plurality of fan cowls 212, a plurality of thrust reversers 214, and a plurality of core cowls 216. The nacelle 208 may aerodynamically blend with the upper support section of the attachment assembly 300 (described in more detail below). The nacelle 208 also forms a fan duct 218 bypassing the core 202.

The inlet 210 is the forward-most portion of the nacelle 208 and aerodynamically guides airflow toward the fan 204. The inlet 210 also aerodynamically guides airflow around the engine 200 (alongside and below the nacelle 208 and over the upper support section of the attachment assembly 300.

The fan cowls 212 provide access to the fan 204 and may be pivotably attached to the lower support section 304 of the attachment assembly 300. The fan cowls 212 may be mounted lower than conventional fan cowls, thus allowing them to provide improved access to the fan 204. More specifically, this allows greater cowling open angles and reduces size and weight of the fan cowls 212. The lower pivot axis facilitates engine placement closer to the wing 400.

The thrust reversers 214 may be vents or air passageways including actuatable doors or assemblies configured to be opened and redirect fan duct airflow forward, thus providing reverse thrust. The thrust reversers 214 are described as being part of the nacelle 208, but they may also or alternatively be incorporated or integrated into the attachment assembly 300. Thrust reversers of the attachment assembly 300 and nacelle 208 may be activated independently or in coordination.

Alternatively, nacelle components of different configurations may be used. For example, a one-piece thrust reverser or fan duct spanning from side to side and slideably supported by the attachment assembly 300 to translate rearward and thereby provide access to internal components may be implemented.

The thrust reversers 214 may be activated via mechanical or electronic means, which may employ coordination of the thrust reversers 214 (including thrust reversers integrated into the attachment assembly 300). This may include pivoting or linkage connections, interlocking features, flexible drive shafts, hoses, or cables. The thrust reversers 214 may include flow-directing cascades. Non-translating cowl type thrust reversers may be most beneficial in terms of their low weight.

The core cowls 216 are fan duct flow surfaces closest to and covering the core 202. The core cowls 216 may be supported from and pivotably or slideably attached to the lower support section 304 of the attachment assembly 300. Alternatively, the core cowls 216 may be pivotably or slideably attached to supports on the core 202.

Nacelle components conventionally are configured with their pivot point as high as possible to facilitate greater engine access. However, engine placement close to the wing may limit the ability to open these components (especially on the inboard side). Thus, the nacelle components of the present invention may have a lower pivoting interface to reduce their swing path and prevent interference with the wing 400.

Integration of movable reverse thrust components may result in a "dead zone" near reverse thrust support structure. It may be beneficial to lower the upper edge of some reverse thrust components to approximately a horizontal plane passing through the engine centerline. For example, lowering the upper edge of such reverse thrust components may allow the use of a one-piece thrust reverser with a substantially fore-aft sliding support. Additional "fixed" reverse thrust components may be integrated above this upper edge.

The fan ducts 218 are airflow channels that bypass the core 202. The fan ducts 218 are outwardly bounded by the inlet 210, fan case 206, and thrust reverser 214 inner surface and inwardly bounded by the core cowls 216. Fan duct airflow may also be redirected by the thrust reversers 214.

The mounts include forward mounts, thrust mounts, and an aft mount. The forward mounts provide a connection point for an upper support section of the attachment assembly 300. The thrust mounts and the aft mount provide a connection point for a lower support section of the attachment assembly 300. These components are described in more detail below.

The attachment assembly 300 comprises an upper support section 302, a lower support section 304, and an aft section 306. The attachment assembly 300 (and the upper support section 302 in particular), aerodynamically blends the shape of the engine with the shape of the wing 400 to lessen flow separation to minimize drag and performance penalties.

The upper support section 302 includes a plurality of spars 308, a plurality of ribs 310, a plurality of forward engine supports 312, an upper skin 314, a lower skin 316, a fan duct acoustic panel, and opposing left and right strakes 320. The upper support section 302 (and the spars 308, ribs 310, upper skin 314, and lower skin 316 in particular) may be at least partially formed of composite material. This allows the upper support section 302 to have optimized shaping and an improved strength-to-weight ratio. The upper support section 302 may have a width greater than its height. In one embodiment, the upper support section 302 may have a width between approximately 50 percent and approximately 70 percent of a width of the engine 200.

The spars 308 extend longitudinally from the wing 400 to the inlet of the engine 200 (described below). In one embodiment, the spars 308 include a middle spar and opposing left and right spars laterally spaced from and lower than the middle spar. Other numbers of spars including between two spars and ten spars, for example, may be used. At least portions of the spars 308 may be slightly shaped (e.g., tapered or curved) to accommodate other components or for aerodynamics (particularly for open airflow above the attachment assembly 300 and fan airflow within the engine 200 and attachment assembly 300 as described in more detail below.

The ribs 310 extend laterally between the spars 308 to form a rigid, structural grid. At least portions of the ribs 310 may be slightly shaped (e.g., tapered or curved) to accommodate other components or for aerodynamics (particularly for open airflow above the attachment assembly 300 and fan airflow within the engine 200 and attachment assembly 300 as described in more detail below. For example, the ribs 310 may be substantially arcuate so that the upper support section 302 is laterally bowed, thereby conforming to an overall shape of the engine 200.

The orthogonal orientation of the spars 308 and ribs 310 as described is just one arrangement that achieves objectives of the invention. Other or additional architecture such as those derived from biomimicry syntheses and alternative materials may also be used. The enlarged structural volume and self-stiffening curved shape of the upper support section 302 provides improved torsional stiffness for managing deflection of the engine 200.

The forward engine supports 312 may be positioned on the left, right, and center spars 308 and attach the upper support section 302 to the fan case 206 via the forward mounts. The forward engine supports 312 may include failsafe or backup features such as tang-and-catcher elements and pin and receiving bore interfaces. The forward engine supports 312 may only need to react lateral (side-to-side) loads, vertical loads, and torque about the engine centerline. In combination with other supports, the forward engine supports 312 may also react pitching and yaw moments.

The forward engine supports 312 may be positioned substantially in a single plane. Additional support may be employed in a forward region of the upper support section 302 to further stabilize the fan case 206, thus reducing the potential for "backbone" bending (i.e., flexing of the engine 200 along its centerline axis).

A central support (e.g., the forward engine support positioned on the center spar) may include a resilient restraint for resisting lateral and fore-aft movement of the engine 200. The central support may also be used as a hoist point for raising and lowering the engine 200 (e.g., for engine changes).

The upper skin 314 extends over the spars 308 and ribs 310 to form a continuous aerodynamic surface from the inlet 210 of the engine 200 to the upper surface 402 of the wing 400. As mentioned above, the upper skin 314 may be formed of composite material or any other suitable material. The upper skin 314 may also be coated in an aerodynamic material.

The lower skin 316 extends under the spars 308 and ribs 310. The lower skin may at least partially serve as an aerodynamic surface for fan duct airflow and as such may be treated for aerodynamics and acoustics. As mentioned above, the lower skin 316 may be formed of composite material or any other suitable material. The lower skin 316 may be integral to the spars 308 and ribs 310 or may be configured to be separable therefrom.

The fan duct acoustic panel may be attached to the lower skin 316 and reduces acoustic output of the engine 200. The fan duct acoustic panel may also be shaped to help direct fan duct airflow.

The left and right strakes 320 may connect the left and right spars 308 and the leading edge 406 of the wing 400. Upper surfaces of the left and right strakes 320 smoothly blend with the upper surface of the upper support section 302 and the upper surface 402 of the wing 400. Lower surfaces of the left and right strakes 320 blend the nacelle 208 with the lower surface 404 of the wing 400. In this way, the left and right strakes 320 aerodynamically meld the attachment assembly 300 and the leading edge 406 together to smoothly divide air flowing over the engine 200 and air flowing laterally alongside the nacelle 208. Forward portions of the left and right strakes 320 may extend over a majority of the nacelle 208. In many embodiments, the left and right strakes 320 are not identical, but may mirror left and right strakes for an opposing engine. A shape of the left and right strakes 320 may conform to local flow lines.

The upper support section 302 may also include thrust reverse components or capability (also described below). The thrust reverse components may allow fan duct flow to pass between the spars 308 and ribs 310. Shape and width of the upper support section 302 may be influenced by the left and right strakes 320 and reverse thrust integration. The left and right strakes 320 may be "secondary structure" and not an integral part of the upper support section 302, which may simplify manufacturing and maintainability. As such, strake location may be seen as constraining an overall width of the upper support section 302. On the other hand, reverse thrust flow passages may need to maximize flow, thus requiring the reverse thrust flow passages and hence the upper support section 302 to be as wide as possible.

The lower support section 304 includes an aft engine support member 322, a support beam 324, left and right support links 326, an aft engine support 328, a bifurcation fairing 329, and a fire seal. The lower support section 304 provides direct support to the core 202.

The aft engine support member 322 extends forward from the wing 400 under the upper support section 302. The aft engine support member 322 may have sufficient strength and rigidity to bear much of the weight of the core 202.

The support beam 324 extends forward and diagonally downward from the aft engine support member 322 to near the thrust links forward connection on the upper side of the core 202. The lower support section 304 reacts a large portion of the weight of the core 202 and thrust loads to the aft engine support member 322.

The left and right thrust links 326 extend forward and diagonally downward and laterally outward from the aft engine support member 322 to core mounts on the left and right sides of the core 202. The left and right thrust links 326 transmit thrust forces of the engine 200 to the aft engine support member 322.

The aft engine support 328 connects to core mounts near a rear portion of the top side of the core 202. The aft engine support reacts weight and thrust load forces of the back end of the core 202 to the aft engine support member 322.

The bifurcation fairing 329 may be positioned near a front of the aft engine support member 322. The bifurcation fairing 329 redirects fan duct airflow around the aft engine support member 322 and other internal components. The bifurcation fairing 329 may be constructed of heat-resilient materials or high-temperature composites.

The fire seal may be positioned below the aft engine support member 322 and the support beam 324. The fire seal may be made of a heat and fire-resistant material to protect many of the structural components (e.g., aft engine support member 322, support beam 324, and upper support section 302) from engine fire. To that end, the fire seal may be a sheet material or compressible seal barrier forming a firewall.

The aft section 306 includes a plurality of fairings 330, a fairing heat shield 332, a wing heat shield 334, and thermal insulation. The aft section 306 provides improved aerodynamics, thermal protection, and improved acoustic characteristics in the vicinity of the engine 200.

The fairings 330 include inboard and outboard fairings configured to aerodynamically bring fan duct airflow together behind the lower support section 304 below the lower surface 404 of the wing 400. More specifically, the fairings 330 optimize airflow along the lower surface 404 of the wing 400 at locations inboard and outboard of the engine centerline. The fairings 330 may integrate to portions of the nacelle fan duct 218 that may extend aft of the nacelle fan duct exit plane and may have a shape approximate to a fan air exhaust plume expansion boundary. The fairings 330 may also control or optimize airflow along the lower surface 404 of the wing 400. More specifically, the fairings 330 may channel fan duct airflow below the lower surface 404 of the wing 400 to lesson parasitic scrubbing drag that may occur from fan duct airflow friction with the lower surface 404 of the wing 400.

The fairing heat shield 332 may be positioned below the fairings 330 to mitigate engine exhaust impingement and radiant thermal exposure to the lower surface 404 of the wing 400. The fairing heat shield 332 may be formed of high heat resistant material such as high-temperature composites.

The wing heat shield 334 may be positioned adjacent the lower surface 404 of the wing 400 to provide further protection to the wing 400 from engine exhaust impingement and radiant thermal exposure. The wing heat shield 334 may employ an air gap between itself and the lower surface 404 of the wing 400. The wing heat shield 334 may be formed of high heat resistant material such as high-temperature composites.

The thermal insulation may be positioned in the air gap created by the wing heat shield 334. This provides additional protection from engine exhaust impingement and radiant thermal exposure to the wing 400.

The thermal protection may be passive (e.g., the aforementioned insulation), or active. An active thermal barrier may use forced air from sources such as flow extracted from the fan duct 218 or ambient (ram) air flow while in flight. On the ground (i.e., when the aircraft is not in flight), sources may include flow extracted from the fan duct 218. With the engine 200 off, forced flow enabled by an electric fan may provide cooling while on the ground and protect the wing 400 from engine "soak-back" (residual heat radiating from the hot engine).

As described above, integration of the attachment assembly 300 with the wing 400 may employ discrete mechanical attachments, a plurality of mechanical and/or bonded connections, or integral construction with the wing 400, such as attachment assembly spars being aligned with and continuous with wing spars. Bracing may be used between portions of the attachment assembly 300 and the wing 400. The lower support section 304 may act as an integral brace from the lower surface 404 of the wing 400 to an area of the upper support section 302. Alternatively, elements of the lower support section 304 may be connected by bracing means to the wing 400.

The attachment assembly 300 may be integrated to the wing 400 in one or a combination of several ways. For example, the attachment assembly 300 may be attached to the front spar of the wing 400 via distributed or discrete attachment. Distributed attachment may include a plurality of abutting or overlapping connections. Discrete attachment may include at least one major connection, such as a collection of lugs connected by a pin. Discrete attachment may employ multiple redundant or alternate load paths to provide failsafe integration of the attachment assembly 300 to the wing 400. Some or all attachments may be located proximate to the upper surface 402 and lower surface 404 of the wing 400. The attachment assembly 300 may be integrated with an inboard or outboard portion of the wing 400 or a portion of the wing that is both inboard and outboard. Integration of the attachment assembly 300 to the wing 400 may allow separation of the engine 200 and nacelle 208 from the wing 400. This may include "safe separation" joints that sever at a predefined load to avoid further damage or risk. Separation means may be an integral part of the attachment assembly 300 that fails under extreme load in predictable fashion.

Positioning of the engine 200 relative to the wing 400 may be constrained to several factors, including upper surface shape for airflow over the engine 200 onto the upper surface 402 of the wing 400, available structural volume for the engine 200, fan duct exit area near the lower surface 404 of the wing 400 due to choked flow, and high temperature exhaust flow near the lower surface 404 of the wing 400.

Upper surface venting may be used to mitigate potential flow separation above the wing 400. Assuming an acceptable flow transition shape, sufficient structural volume is needed for the attachment assembly 300, which may require lower positioning of the engine 200. Additional consideration may need to be given to the fan duct airflow exit area adjacent to the lower surface 404 of the wing 400 to mitigate choking the airflow in the upper region of the fan duct. Furthermore, hot exhaust flow plume proximity to the lower surface 404 of the wing 400 may require the engine to be moved away from the wing 400. Exhaust flow may also be directed away from the lower surface 404 of the wing 400 by angling the centerline axis of the primary exhaust nozzle downward.

The above-described aircraft propulsion system 100 provides several advantages. For example, the attachment assembly 300 aerodynamically melds the nacelle 208 and the wing 400 together so that air flowing over the engine 200 flows over the wing 400 along the upper surface 402 of the wing 400 and air flowing laterally alongside the nacelle 208 flows under the wing 400 along the lower surface 404 of the wing 400. The attachment assembly 300 accommodates several competing design considerations, including engine size, engine location and ground clearance, engine maintenance access, engine-wing aerodynamics, thrust and thrust reversing, and heat protection.

Figure 5:
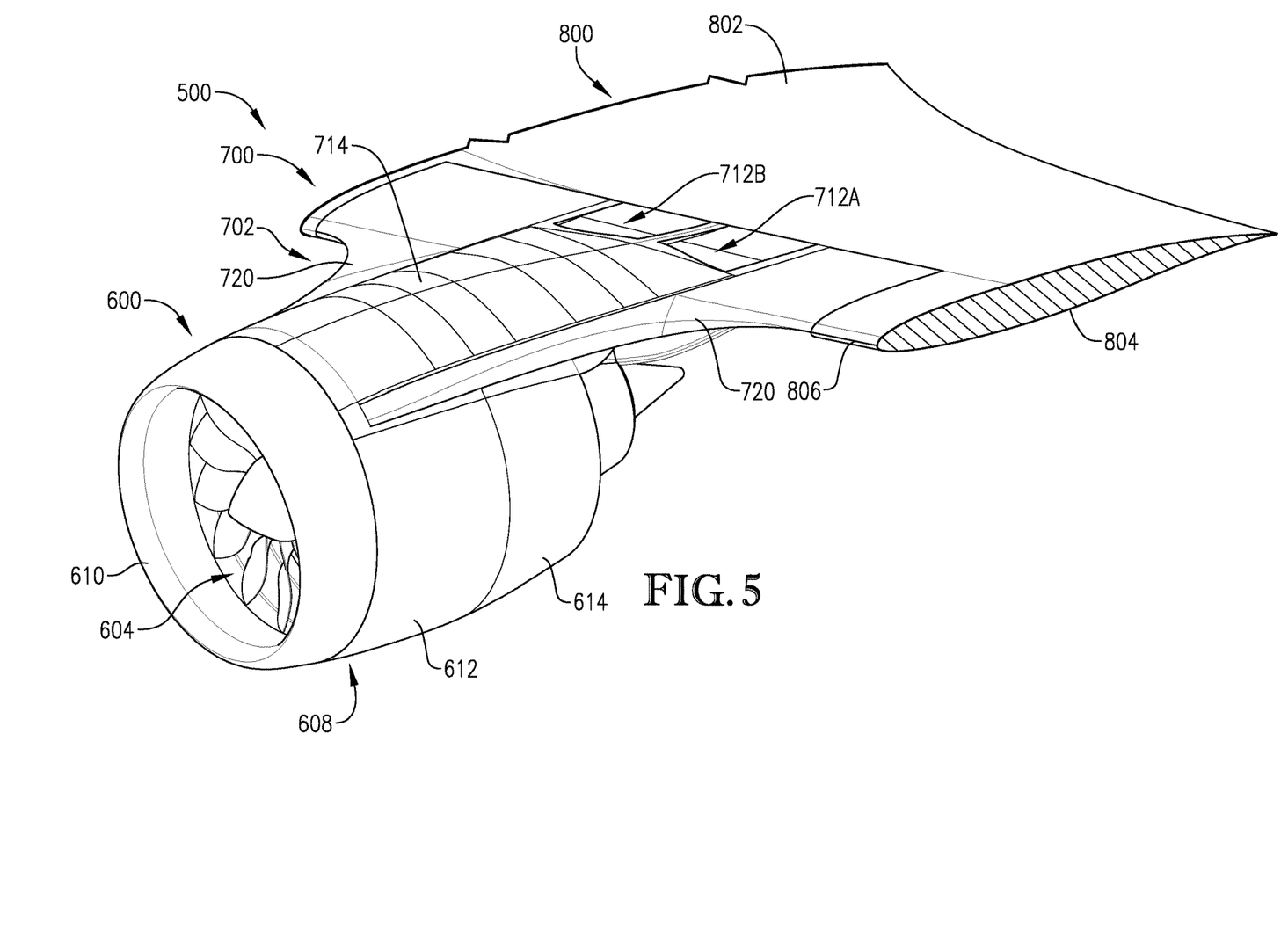
FIG. 5 is a perspective partial cutaway view of an aircraft propulsion system constructed in accordance with another embodiment of the invention.
Figure 6:
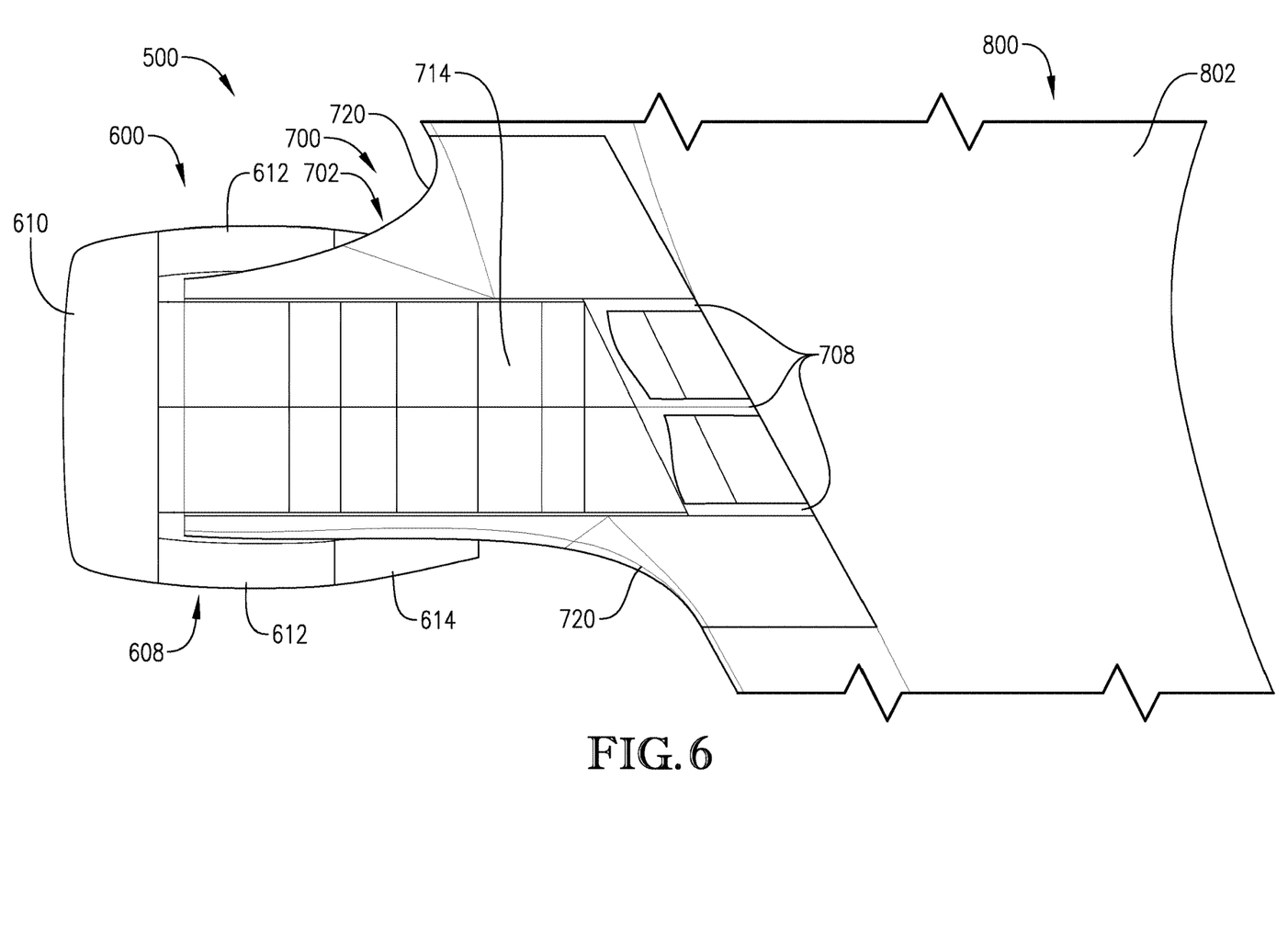
FIG. 6 is a top plan view of the aircraft propulsion system of FIG. 5.
Figure 7:
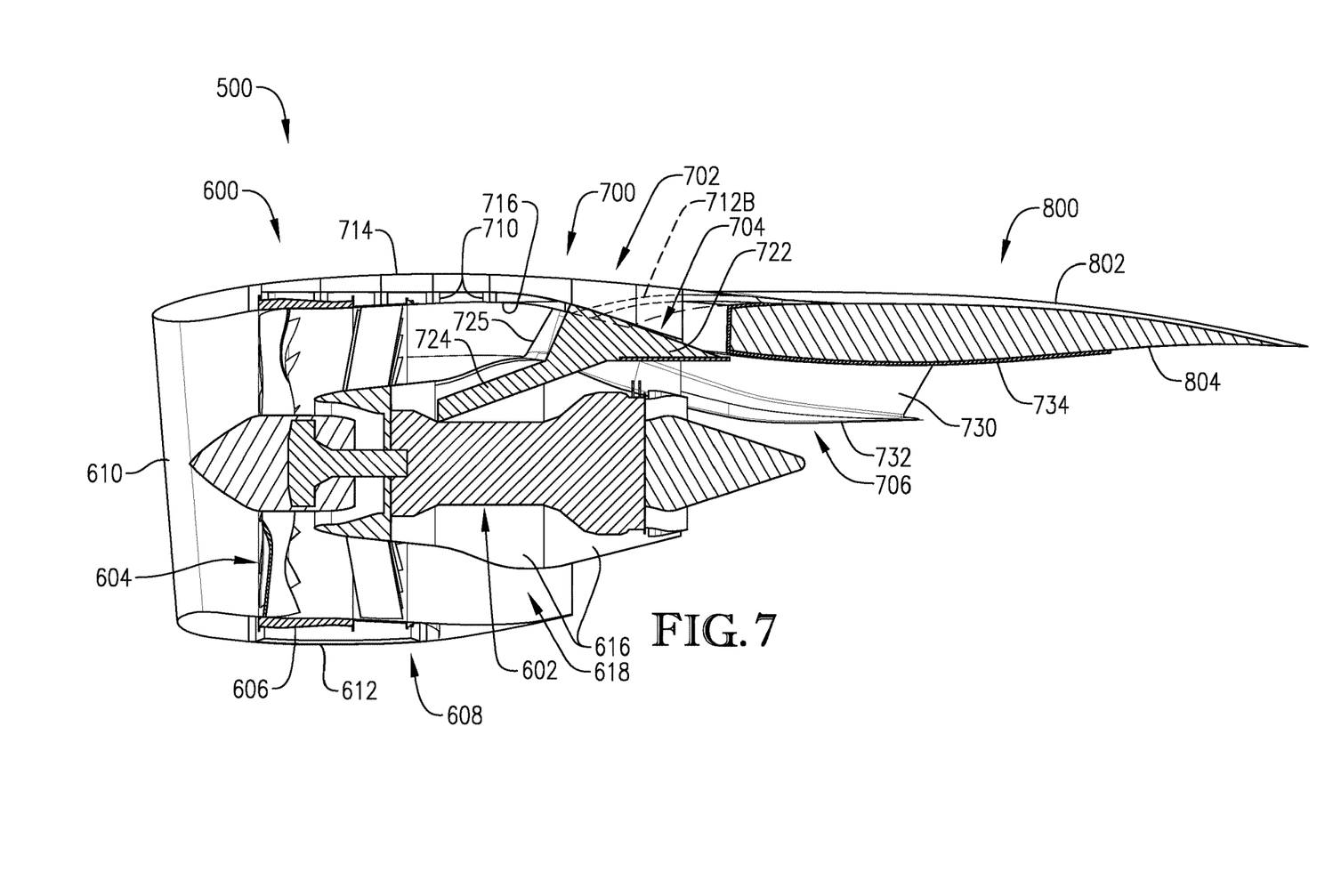
FIG. 7 is a side cutaway elevation view of the aircraft propulsion system of FIG. 5.
Figure 8:
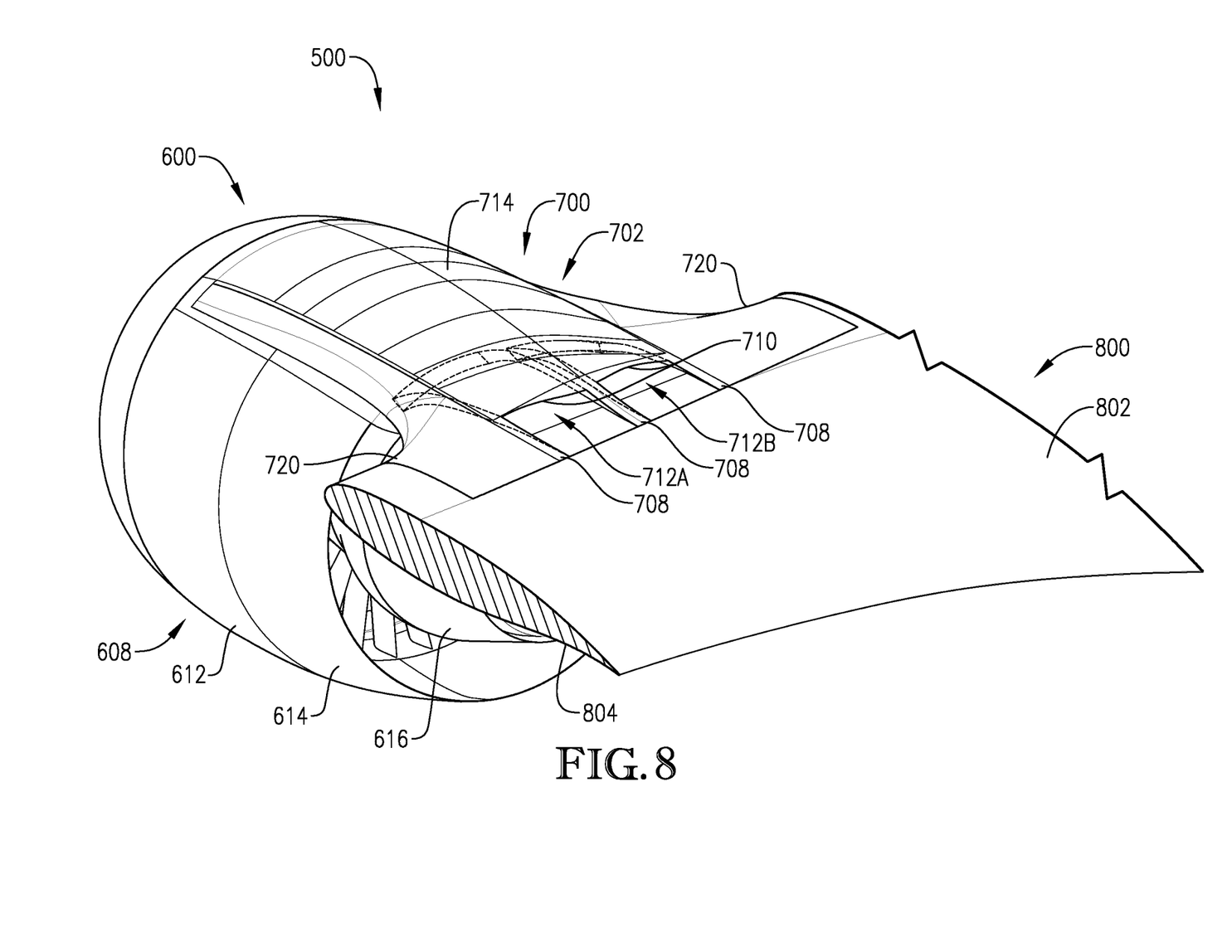
FIG. 8 is a rear perspective partial cutaway view of the aircraft propulsion system of FIG. 5.

Turning to FIGS. 5-8, an aircraft propulsion system 500 constructed in accordance with an embodiment of the invention is illustrated. The aircraft propulsion system 500 broadly comprises an engine 600 and an attachment assembly 700.

The engine 600 includes a core 602, a fan 604, a fan case 606, a nacelle 608, and a plurality of mounts for connecting the engine to the attachment assembly. The engine 600 is described herein as an ultra-high by-pass turbofan, but other propulsion assemblies such as turboprop engines, electric motors, and hybrid-electric engines (inline turbine and electric motor) may be used. The ultra-high by-pass turbofan engine 600 is a separate flow engine-nacelle configuration, but mixed flow engine-nacelle configurations may also be used.

The core 602 is centrally located in the engine 600 and includes a compressor, a burner, a turbine, and other components for creating combustion. The core 602 turns the fan and expels hot exhaust gas from the rear of the engine 600.

The fan 604 is positioned near a front of the engine 600 and is rotationally connected to components of the core 602. The fan 604 generates forward thrust by propelling airflow rearward through fan ducts that bypass the core 602. The fan 604 also directs airflow to the compressor.

The fan case 606 encircles the fan 604 to ensure air flows through the fan 604. The fan case 606 also provides protection to the fan 604.

The nacelle 608 encloses internal components of the engine 600 and includes an inlet 610, a plurality of fan cowls 612, a plurality of thrust reversers 614, and a plurality of core cowls 616. The nacelle 608 may aerodynamically blend with the upper support section of the attachment assembly 700 (described in more detail below). The nacelle 608 also forms a fan duct 618 bypassing the core 602.

The inlet 610 is the forward-most portion of the nacelle 608 and aerodynamically guides airflow toward the fan 604.

The inlet 610 also aerodynamically guides airflow around the engine 600 (alongside and below the nacelle 608 and over the upper support section of the attachment assembly 700.

The fan cowls 612 provide access to the fan 604 and may be pivotably attached to the lower support section 704 of the attachment assembly 700. The fan cowls 612 may be mounted lower than conventional fan cowls, thus allowing them to provide improved access to the fan 604. More specifically, this allows greater cowling open angles and reduces size and weight of the fan cowls 612. The lower pivot axis facilitates engine placement closer to the wing 800.

The thrust reversers 614 are actuatable doors or assemblies configured to be opened and redirect fan duct airflow forward, thus providing reverse thrust. The thrust reversers 614 are described as being part of the nacelle 608, but they may also or alternatively be incorporated or integrated into the attachment assembly 700. Thrust reversers of the attachment assembly 700 and nacelle 608 may be activated independently or in coordination.

Alternatively, nacelle components of different configurations may be used. For example, a one-piece thrust reverser or fan duct spanning from side to side and slideably supported by the attachment assembly 700 to translate rearward and thereby provide access to internal components may be implemented.

The thrust reversers 614 may be activated via mechanical or electronic means, which may employ coordination of the thrust reversers 614 (including thrust reversers integrated into the attachment assembly 700). This may include pivoting or linkage connections, interlocking features, flexible drive shafts, hoses, or cables. The thrust reversers 614 may include flow-directing cascades. Non-translating cowl type thrust reversers may be most beneficial in terms of their low weight.

The core cowls 616 are fan duct flow surfaces closest to and covering the core 602. The core cowls 616 may be supported from and pivotably or slideably attached to the lower support section 704 of the attachment assembly 700. Alternatively, the core cowls 616 may be pivotably or slideably attached to supports on the core 602.

The fan ducts 618 are airflow channels that bypass the core 602. The fan ducts 618 are outwardly bounded by the inlet 610, fan case 606, and thrust reverser 614 inner surfaces and inwardly bounded by the core cowls 616. Fan duct airflow may also be redirected by the thrust reversers 614.

The mounts include forward mounts, thrust mounts, and an aft mount. The forward mounts provide a connection point for an upper support section of the attachment assembly 700. The thrust mounts and the aft mount provide a connection point for a lower support section of the attachment assembly 700. These components are described in more detail below.

The attachment assembly 700 comprises an upper support section 702, a lower support section 704, and an aft section 706. The attachment assembly 700 (and the upper support section 702 in particular), aerodynamically blends the shape of the engine with the shape of the wing 800 to lessen flow separation to minimize drag and performance penalties.

The upper support section 702 includes a plurality of spars 708, a plurality of ribs 710, a plurality of forward engine supports, an upper skin 714, a lower skin 716, a fan duct acoustic panel, airflow vents 712A,B and opposing left and right strakes 720. The upper support section 702 (and the spars 708, ribs 710, upper skin 714, and lower skin 716 in particular) may be at least partially formed of composite material. This allows the upper support section 702 to have optimized shaping and an improved strength-to-weight ratio. The upper support section 702 may have a width greater than its height.

The spars 708 extend longitudinally from the wing 800 to the inlet of the engine 600 (described below). In one embodiment, the spars 708 include a middle spar and opposing left and right spars laterally spaced from and lower than the middle spar. Other numbers of spars including between two spars and ten spars, for example, may be used. At least portions of the spars 708 may be slightly shaped (e.g., tapered or curved) to accommodate other components or for aerodynamics (particularly for open airflow above the attachment assembly 700 and fan airflow within the engine 600 and attachment assembly 700 as described in more detail below.

The ribs 710 extend laterally between the spars 708 to form a rigid, structural grid. At least portions of the ribs 710 may be slightly shaped (e.g., tapered or curved) to accommodate other components or for aerodynamics (particularly for open airflow above the attachment assembly 700 and fan airflow within the engine 600 and attachment assembly 700 as described in more detail below. For example, the ribs 710 may be substantially arcuate so that the upper support section 702 is laterally bowed, thereby conforming to an overall shape of the engine 600.

The forward engine supports may be positioned on the left, right, and center spars 708 and attach the upper support section 702 to the fan case 606 via the forward mounts. The forward engine supports may include failsafe or backup features such as tang-and-catcher elements and pin and receiving bore interfaces. The forward engine supports may only need to react lateral (side-to-side) loads, vertical loads, and torque about the engine centerline. In combination with other supports, the forward engine supports may also react pitching and yaw moments.

The forward engine supports may be positioned substantially in a single plane. Additional support may be employed in a forward region of the upper support section 702 to further stabilize the fan case 606, thus reducing the potential for "backbone" bending (i.e., flexing of the engine 600 along its centerline axis).

A central support (e.g., the forward engine support positioned on the center spar) may include a resilient restraint for resisting lateral and fore-aft movement of the engine 600. The central support may also be used as a hoist point for raising and lowering the engine 600 (e.g., for engine changes).

The upper skin 714 extends over the spars 708 and ribs 710 to form a continuous aerodynamic surface from the inlet 610 of the engine 600 to the upper surface 802 of the wing 800. As mentioned above, the upper skin 714 may be formed of composite material or any other suitable material.

The lower skin 716 extends under the spars 708 and ribs 710. The lower skin may at least partially serve as an aerodynamic surface for fan duct airflow and as such may be treated for aerodynamics and acoustics. As mentioned above, the lower skin 716 may be formed of composite material or any other suitable material. The lower skin 716 may be integral to the spars 708 and ribs 710 or may be configured to be separable therefrom.

The fan duct acoustic panel may be attached to the lower skin 716 and reduces acoustic output of the engine 600. The fan duct acoustic panel may also be shaped to help direct fan duct airflow.

The left and right airflow vents 712A,B extend from the fan duct to the upper skin 714. The left and right airflow vents 712A,B utilize fan duct airflow to re-energize the boundary layer of air flowing over the upper support section 702 and the upper surface 802 of the wing 800, thus aiding in continued flow attachment. The left and right airflow vents 712A,B may be formed at least partially via composite material. The left and right airflow vents 712A,B may form a single channel or a plurality of channels integrated with the spars 708 and ribs 710. Airflow may exit at one or more locations along a length of upper support section 702 and may include a manifold to achieve airflow distribution.

In one embodiment, the left and right airflow vents 712A,B may each include a door (or may share a door) moveable between an open and closed position or in intermediate increments. The door may be configured to pivot, slide, translate, or a combination thereof. For installations with reverse thrust capability, the door and a portion of the fan ducts may be integrated with flow redirecting panels. These portions may move with the flow redirecting panels during their operation and may, upon returning to a forward thrust configuration, seal against the left and right airflow vents 712A,B. The left and right airflow vents 712A,B (or additional vents) may be located on side walls near the bifurcation fairing (described below) or any other suitable location and may incorporate scoops to capture sufficient flow volume. Heat exchangers, intercoolers, and pre-coolers may also be integrated with the left and right airflow vents 712A,B, thus providing multifunctional use therefrom.

In an alternative embodiment, small openings in the upper skin 714 along with suction means may be used to promote extended laminar flow over the upper support section 702 and the upper surface 802 of the wing 800. The suction means may include a mechanical device (e.g., a pump) or a connection to an area of lower pressure. Suction may be controlled depending on aircraft attitude and flight region (e.g., takeoff or cruise).

The left and right strakes 720 may connect the left and right spars 708 and the leading edge 806 of the wing 800. Upper surfaces of the left and right strakes 720 smoothly blend with the upper surface of the upper support section 702 and the upper surface 802 of the wing 800. Lower surfaces of the left and right strakes 720 blend the nacelle 608 with the lower surface 804 of the wing 800. In this way, the left and right strakes 720 aerodynamically meld the attachment assembly 700 and the leading edge 806 together to smoothly divide air flowing over the engine 600 and air flowing laterally alongside the nacelle 608. Forward portions of the left and right strakes 720 may extend over a majority of the nacelle 608. In many embodiments, the left and right strakes 720 are not identical, but may mirror left and right strakes for an opposing engine. A shape of the left and right strakes 720 may conform to local flow lines.

The lower support section 704 includes an aft engine support member 722, a support beam 724, left and right thrust links, an aft engine support, a bifurcation fairing 725, and a fire seal. The lower support section 704 provides direct support to the core 602.

The aft engine support member 722 extends forward from the wing 800 under the upper support section 702. The aft engine support member 722 may have sufficient strength and rigidity to bear much of the weight of the core 602.

The support beam 724 extends forward and diagonally downward from the aft engine support member 722 to near the thrust links forward connection on the upper side of the core 602. The lower support section 704 reacts a large portion of the weight of the core 602 and thrust loads to the aft engine support member 722.

The left and right thrust links extend forward and diagonally downward and laterally outward from the aft engine support member 722 to core mounts on the left and right sides of the core 602. The left and right thrust links transmit thrust forces of the engine 600 to the aft engine support member 722.

The aft engine support connects to core mounts near a rear portion of the top side of the core 602. The aft engine support reacts weight and thrust load forces of the back end of the core 602 to the aft engine support member 722.

The bifurcation fairing 725 may be positioned near a front of the aft engine support member 722. The bifurcation fairing 725 redirects fan duct airflow around the aft engine support member 722 and other internal components. The bifurcation fairing 725 may be constructed of heat-resilient materials or high-temperature composites.

The fire seal may be positioned below the aft engine support member 722 and the support beam 724. The fire seal may be made of a heat and fire-resistant material to protect many of the structural components (e.g., aft engine support member 722, support beam 724, and upper support section 702) from engine fire. To that end, the fire seal may be a sheet material or compressible seal barrier forming a firewall.

The aft section 706 includes a plurality of fairings 730, a fairing heat shield 732, a wing heat shield 734, and thermal insulation. The aft section 706 provides improved aerodynamics, thermal protection, and improved acoustic characteristics in the vicinity of the engine 600.

The fairings 730 include inboard and outboard fairings configured to aerodynamically bring fan duct airflow together behind the lower support section 704 below the lower surface 804 of the wing 800. More specifically, the fairings 730 aerodynamically optimize airflow along the lower surface 804 of the wing 800 at locations inboard and outboard of the engine centerline. The fairings 730 may integrate to portions of the nacelle fan duct 618 that may extend aft of the nacelle fan duct exit plane and may have a shape approximate to a fan air exhaust plume expansion boundary. The fairings 730 may also control or optimize airflow along the lower surface 804 of the wing 800. More specifically, the fairings 730 may channel fan duct airflow below the lower surface 804 of the wing 800 to lessen parasitic scrubbing drag that may occur from fan duct airflow friction with the lower surface 804 of the wing 800.

The fairing heat shield 732 may be positioned below the fairings 730 to mitigate engine exhaust impingement and radiant thermal exposure to the lower surface 804 of the wing 800. The fairing heat shield 732 may be formed of high heat resistant material such as high-temperature composites.

The wing heat shield 734 may be positioned adjacent the lower surface 804 of the wing 800 to provide further protection to the wing 800 from engine exhaust impingement and radiant thermal exposure. The wing heat shield 734 may employ an air gap between itself and the lower surface 804 of the wing 800. The wing heat shield 734 may be formed of high heat resistant material such as high-temperature composites.

The thermal insulation may be positioned in the air gap created by the wing heat shield 734. This provides additional protection from engine exhaust impingement and radiant thermal exposure to the wing 800.

The thermal protection may be passive (e.g., the aforementioned insulation), or active. An active thermal barrier may use forced air from sources such as flow extracted from the fan duct 618 or ambient (ram) air flow while in flight. On the ground (i.e., when the aircraft is not in flight), sources may include flow extracted from the fan duct 618. With the engine 600 off, forced flow enabled by an electric fan may provide cooling while on the ground and protect the wing 800 from engine "soak-back" (residual heat radiating from the hot engine).

The above-described aircraft propulsion system 500 provides several advantages. For example, the attachment assembly 700 aerodynamically melds the nacelle 608 and the wing 800 together so that air flowing over the engine 600 flows over the wing 800 along the upper surface 802 of the wing 800 and air flowing laterally alongside the nacelle 608 flows under the wing 800 along the lower surface 804 of the wing 800. The left and right airflow vents 712A,B utilize fan duct airflow to re-energize the boundary layer of air flowing over the upper support section 702 and the upper surface 802 of the wing 800, thus aiding in continued flow attachment. The left and right airflow vents 712A,B, also provide multifunctional use therefrom. The attachment assembly 700 accommodates several competing design considerations, including engine size, engine location and ground clearance, engine maintenance access, engine-wing aerodynamics, thrust and thrust reversing, and heat protection.

Although the invention has been described with reference to the preferred embodiment illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An attachment assembly for supporting an engine from an aircraft wing having a leading edge and opposing upper and lower surfaces, the engine having a core, a fan case, and a nacelle, the attachment assembly comprising:
    an upper support section connected to the fan case, the upper support section including:
    a plurality of spars spaced laterally from each other and extending longitudinally from the aircraft wing to the fan case; and
    a plurality of laterally extending ribs connected between the plurality of spars; and
    a lower support section connected to the core,
    the attachment assembly aerodynamically melding the nacelle and the aircraft wing together via the upper support section so that air flowing over the engine flows over the aircraft wing along the upper surface and air flowing laterally alongside the nacelle flows under the aircraft wing along the lower surface;
    the plurality of spars comprising three spars laterally spaced apart along an arc, each of the three spars spanning longitudinally from the wing to the fan case.

2. The attachment assembly of claim 1, the upper support section being at least partially formed of composite material.

3. The attachment assembly of claim 1, the upper support section having a width greater than its height.

4. The attachment assembly of claim 1, the upper support section further comprising opposing left and right strakes configured to aerodynamically meld the upper support section and the leading edge together to smoothly divide air flowing over the engine and air flowing laterally alongside the nacelle.

5. The attachment assembly of claim 1, further comprising an aft section including an aerodynamic fairing positioned below the lower surface of the wing to minimize fan duct airflow drag.

6. The attachment assembly of claim 5, the aft section further including a heat shield below the aerodynamic fairing to mitigate turbine engine exhaust impingement on the aerodynamic fairing.

7. The attachment assembly of claim 6, further comprising an additional heat shield adjacent the lower surface of the wing to mitigate turbine engine exhaust impingement on the wing.

8. The attachment assembly of claim 1, further comprising a vent extending through the upper support section, the vent being configured to direct fan duct airflow over the aircraft wing along the upper surface.

9. The attachment assembly of claim 1, further comprising a reverse thrust vent extending through the upper support section, the reverse thrust vent being configured to redirect fan duct airflow at least partially in a direction countering movement of the aircraft wing.

10. The attachment assembly of claim 1, the lower support section including a bifurcation fairing for directing fan duct airflow laterally alongside the lower support section.

11. An aircraft propulsion system configured to be supported from an aircraft wing having a leading edge and opposing upper and lower surfaces, the aircraft propulsion system comprising:
    an engine having a core, a fan case, and a nacelle including a plurality of access panels; and
    an attachment assembly for securing the engine to the aircraft wing, the attachment assembly comprising:
    an upper support section connected to the fan case, the upper support section including:
    a plurality of spars spaced laterally from each other and extending longitudinally from the aircraft wing to the fan case; and
    a plurality of laterally extending ribs connected between the plurality of spars;
    a lower support section connected to the core;
    a vent extending through the upper support section, the vent being configured to direct fan duct airflow over the aircraft wing along the upper surface; and
    a reverse thrust vent extending through the upper support section, the reverse thrust vent being configured to redirect fan duct airflow at least partially in a direction countering movement of the aircraft wing,
    the plurality of access panels being pivotably connected to the attachment assembly,
    the attachment assembly aerodynamically melding the nacelle and the aircraft wing together via the upper support section so that air flowing over the engine flows over the aircraft wing along the upper surface and air flowing laterally alongside the nacelle flows under the aircraft wing along the lower surface;
    the plurality of spars comprising three spars laterally spaced apart along an arc, each of the three spars spanning longitudinally from the wing to the fan case.

12. The aircraft propulsion system of claim 11, the upper support section being at least partially formed of composite material.

13. The aircraft propulsion system of claim 11, the upper support section having a width greater than its height.

14. The aircraft propulsion system of claim 11, the upper support section further comprising opposing left and right strakes configured to aerodynamically meld the upper support section and the leading edge together to smoothly divide air flowing over the engine and air flowing laterally alongside the nacelle.

15. The aircraft propulsion system of claim 11, the attachment assembly further comprising an aft section including an aerodynamic fairing positioned below the lower surface of the wing to minimize fan duct airflow drag.

16. The aircraft propulsion system of claim 15, the aft section further including a heat shield below the aerodynamic fairing to mitigate turbine engine exhaust impingement on the aerodynamic fairing.

17. The aircraft propulsion system of claim 16, the attachment assembly further comprising an additional heat shield adjacent the lower surface of the wing to mitigate turbine engine exhaust impingement on the wing.

18. The aircraft propulsion system of claim 11, the lower support section including a bifurcation fairing for directing fan duct airflow laterally alongside the lower support section.

19. The aircraft propulsion system of claim 11, the upper support section having a width between approximately 50 percent and approximately 70 percent of a width of the engine.

20. An aircraft propulsion system configured to be supported from an aircraft wing having a leading edge and opposing upper and lower surfaces, the aircraft propulsion system comprising:
- an engine having a core, a fan case, and a nacelle including a plurality of access panels; and
- an attachment assembly for securing the engine to the aircraft wing, the attachment assembly comprising:
  - an upper support section connected to the fan case and being at least partially formed of composite material, the upper support section having a width greater than its height and including:
    - a plurality of spars spaced laterally from each other and extending longitudinally from the aircraft wing to the fan case;
    - a plurality of laterally extending ribs connected between the plurality of spars; and
    - opposing left and right strakes configured to aerodynamically meld the upper support section and the leading edge together to smoothly divide air flowing over the engine and air flowing laterally alongside the nacelle;
  - a lower support section connected to the core;
  - a vent extending through the upper support section, the vent being configured to direct fan duct airflow over the aircraft wing along the upper surface; and
  - a reverse thrust vent extending through the upper support section, the reverse thrust vent being configured to redirect fan duct airflow at least partially in a direction countering movement of the aircraft wing,
  - the upper support section having a width between approximately 50 percent and approximately 70 percent of a width of the engine,
  - the plurality of access panels being pivotably connected to the attachment assembly,
  - the attachment assembly aerodynamically melding the nacelle and the aircraft wing together via the upper support section so that air flowing over the engine flows over the aircraft wing along the upper surface and air flowing laterally alongside the nacelle flows under the aircraft wing along the lower surface;
  - the plurality of spars comprising three spars laterally spaced apart along an arc, each of the three spars spanning longitudinally from the wing to the fan case.

* * * * *